US008321235B2

(12) United States Patent
Monson et al.

(10) Patent No.: US 8,321,235 B2
(45) Date of Patent: Nov. 27, 2012

(54) VALIDATING AN ELECTRONIC TRANSACTION

(75) Inventors: Duke G. Monson, McKinney, TX (US); Jianjun Ye, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2763 days.

(21) Appl. No.: 10/305,175

(22) Filed: Nov. 27, 2002

(65) Prior Publication Data

US 2004/0102999 A1 May 27, 2004

(51) Int. Cl.
*G06Q 50/00* (2006.01)
(52) U.S. Cl. ................................. 705/2; 705/4
(58) Field of Classification Search ................. 705/2–4; 434/236; 726/25; 707/100, 102, 4; 704/2, 704/9, 270.01; 709/228; 717/117
See application file for complete search history.

(56) References Cited

U.S. PATENT DOCUMENTS

| | | | |
|---|---|---|---|
| 4,866,707 A | 9/1989 | Marshall et al. | |
| 5,557,780 A | 9/1996 | Edwards | |
| 5,596,752 A * | 1/1997 | Knudsen et al. | 717/117 |
| 5,644,778 A * | 7/1997 | Burks et al. | 705/2 |
| 5,704,044 A | 12/1997 | Tarter et al. | |
| 5,778,370 A * | 7/1998 | Emerson | 707/100 |
| 5,787,000 A | 7/1998 | Lilly et al. | |
| 5,809,212 A | 9/1998 | Shasha et al. | |
| 6,088,804 A | 7/2000 | Hill et al. | |
| 6,112,183 A * | 8/2000 | Swanson et al. | 705/2 |
| 6,208,973 B1 | 3/2001 | Boyer et al. | |
| 6,283,761 B1 * | 9/2001 | Joao | 434/236 |
| 6,519,601 B1 * | 2/2003 | Bosch | 707/100 |
| 7,010,696 B1 | 3/2006 | Cambridge et al. | |
| 7,085,708 B2 * | 8/2006 | Manson | 704/9 |
| 7,287,037 B2 * | 10/2007 | An et al. | 707/102 |
| 2002/0049790 A1 | 4/2002 | Ricker | |
| 2002/0103569 A1 | 8/2002 | Mazur | |
| 2002/0104014 A1 | 8/2002 | Zobel et al. | |
| 2002/0120473 A1 * | 8/2002 | Wiggins | 705/4 |
| 2002/0120846 A1 | 8/2002 | Stewart et al. | |
| 2002/0184373 A1 * | 12/2002 | Maes | 709/228 |
| 2003/0009696 A1 | 1/2003 | Bunker V. et al. | |
| 2003/0171953 A1 * | 9/2003 | Narayanan et al. | 705/2 |
| 2003/0187865 A1 | 10/2003 | Frisina | |
| 2004/0006704 A1 | 1/2004 | Dahlstrom et al. | |
| 2005/0050311 A1 * | 3/2005 | Joseph et al. | 713/1 |

FOREIGN PATENT DOCUMENTS

WO  WO 02/057882  7/2002

OTHER PUBLICATIONS

The International Search Report for International Application No. PCT/US03/37830, dated Aug. 8, 2006, 4 pages.
Office Action from U.S. Appl. No. 10/259,763, dated Aug. 30, 2007, 10 pages.

(Continued)

*Primary Examiner* — Lena Najarian
*Assistant Examiner* — Natalie A Pass

(57) ABSTRACT

An electronic transaction may be processed by receiving an order to execute a transaction electronically, identifying a format for the order, identifying a version of the format, retrieving a metasyntax with a rule related to the identified format and the identified version, the rule defining one or more acceptable arrangements of one or more elements in the transaction, relating the order to the metasyntax, determining whether the order conforms to the metasyntax, and forwarding the order for subsequent processing when the order conforms to the metasyntax.

21 Claims, 4 Drawing Sheets

Flow chart of processing health care transaction

OTHER PUBLICATIONS

Office Action from U.S. Appl. No. 10/259,763, dated Feb. 16, 2007, 11 pages.
Office Action from U.S. Appl. No. 10/259,763, dated Sep. 1, 2006, 11 pages.
Office Action from U.S. Appl. No. 10/259,763, dated Mar. 17, 2006, 10 pages.
Office Action from U.S. Appl. No. 10/259,763, dated Jul. 14, 2005, 10 pages.
Office Action from U.S. Appl. No. 10/259,763, dated Oct. 19, 2004, 9 pages.
Written Opinion for corresponding European Application No. 03787176, mailed Sep. 2, 2008.

* cited by examiner

Transaction Processing System

Flow chart of Transaction processing

Flow chart of processing health care transaction

400

NESTED GROUP SYNTAX /—410
LOOP_10000 = ISA, LOOP_20000#, IEA
LOOP_20000 = GS, LOOP_30000#, GE

Multiple Copies Syntax /—420
LOOP_10000 = ISA, LOOP_20000#, IEA
LOOP_10000 = ISA, LOOP_20000, IEA Optional presence syntax /—430
LOOP_30000 = ST, BHT#, REF*#, LOOP_31000*#, LOOP_32000*#, SE Multiple copies override /—440
LOOP_10000 = ISA, LOOP_20000#, IEA
MULTIPLEOVERRIDE0002 = _10000/_20000

Required elements /—450
LOOP_30000 = ST, BHT#, REF*#, LOOP_31000*#, LOOP_32000*#, SE Conditional Clause Syntax : /—460
MULTIPLEOVERRIDE0004 = _10000/_20000/_30000/_32000/HL-03(20>22>23)

Fig. 4
Exemplary metasyntax

VALIDATING AN ELECTRONIC TRANSACTION

TECHNICAL FIELD

This document relates to processing electronic transactions.

BACKGROUND

Electronic transactions may be formatted with a variety of labels, parameters and arrangements. Different or even related transactions may use different formats. These different formats may be noninteroperable. As such, a system configured to process a first format may be unable to process a second format.

SUMMARY

In one general aspect, an electronic transaction may be automatically processed when an order to execute a transaction electronically is received. A format for the order and a version of the format are identified, and a metasyntax with a rule related to the identified format and the identified version is retrieved. The order is related to the metasyntax, a determination as to whether the order conforms to the metasyntax is made, and the order is forwarded for subsequent processing when the order conforms to the metasyntax. The rule may define one or more acceptable arrangements of one or more elements in the transaction.

Implementations may include one or more of the following features. For example, a message may be generated indicating that the order is not valid when the order does not conform to the metasyntax. A user may be enabled to create a new metasyntax. Enabling a user to create the new metasyntax may be done in response to determining that the order does not conform to the metasyntax.

The metasyntax may define elements treated as a nested group, a required element, multiple copies of an element, or a set of elements. The metasyntax may override a multiple copies attribute. The metasyntax may instruct a program how to parse and process the order. The metasyntax may be forwarded for subsequent processing when the order conforms to the metasyntax.

The details of particular implementations are set forth in the accompanying drawings and the description below. Other features will be apparent from the description and drawings, and from the claims.

DESCRIPTION OF DRAWINGS

FIG. 4 illustrates a metasyntax.

Like reference symbols in the various drawings indicate like elements.

DETAILED DESCRIPTION

Generally, an electronic transaction is processed in response to a received order. A format and version of the order are identified. Using the format and version, a metasyntax with a rule related to the identified format and version is retrieved. The rule defines one or more acceptable arrangements of elements appearing in the transaction. The order is compared to the metasyntax and a determination is made as to whether the order conforms to the metasyntax. When the order conforms to the metasyntax, the order may be forwarded for subsequent processing.

For example, a health care provider may electronically submit a claim for reimbursement to an insurance provider. The insurance provider may receive the claim and identify the format in which the claim was written. The insurance provider then may identify the particular version that was used. For example, different versions of a format may include different fields to achieve HIPAA ("Health Insurance Portability and Accountability Act") compliance for a particular year.

The insurance provider may retrieve a metasyntax describing valid transaction arrangements. For example, some claims may allow for a detailed explanation of unusual circumstances that led to higher costs. The claim may be compared to the rules in the metasyntax to verify that the transaction format is valid. When the order conforms to the metasyntax, the claim may be forwarded to an account adjusting device to execute the transaction. When the claim does not comply with the metasyntax, the claim may be rejected and a message may be sent to the health care provider explaining why the claim was rejected.

Figure 1:
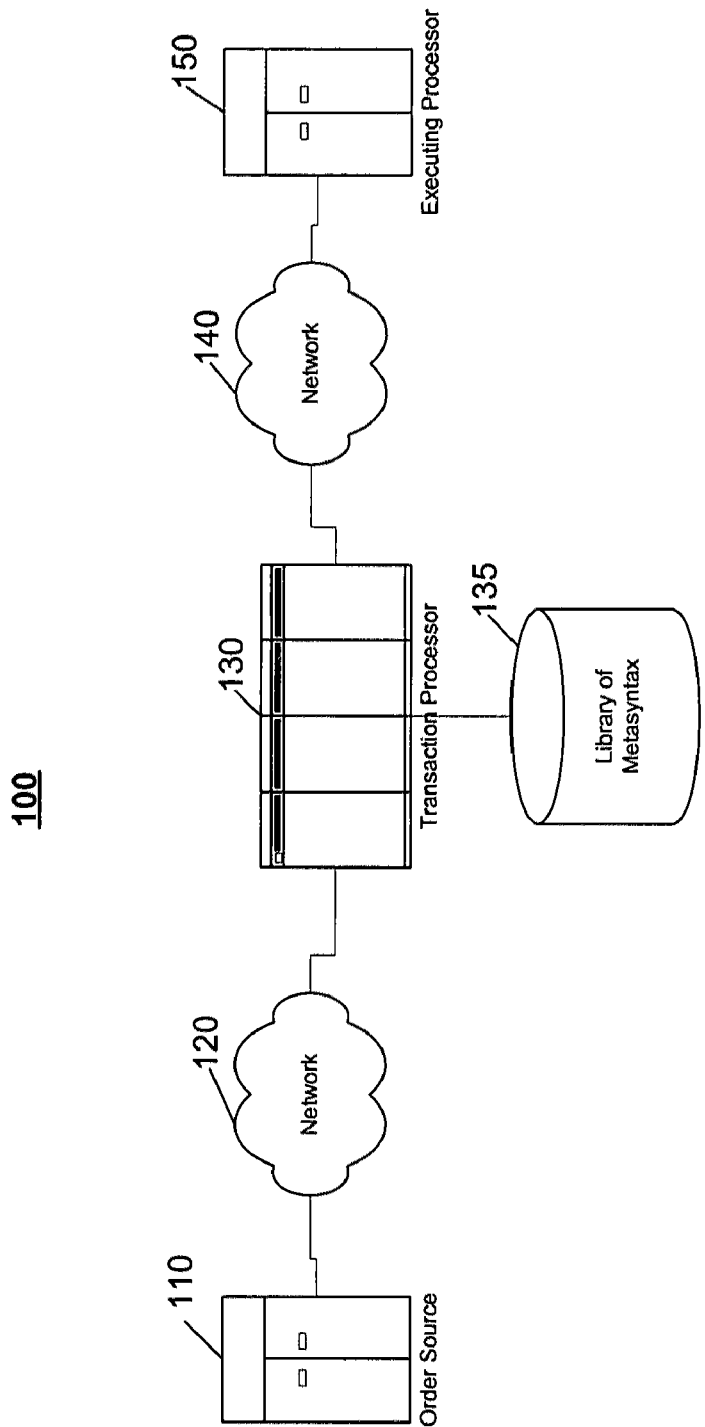
FIG. 1 is a block diagram of a transaction processing system.

Referring to FIG. 1, a communications system 100 includes an order source 110 connected through a network 120 to a transaction processor 130. The transaction processor 130 is connected to a library of metasyntax 135. The transaction processor 130 is also connected through a network 140 to an executing processor 150.

The order source 110 is configured to interface with the transaction processor 130 to validate a transaction electronically. Specifically, the order source 110 transmits to the transaction processor 130 an order to execute a transaction electronically. The transaction processor 130 then processes the received order by identifying a format for the order, identifying a version for the format, and retrieving a metasyntax associated with a rule related to the identified format and the identified version from the library of metasyntax 135. The transaction processor 130 then relates the order to the metasyntax and determines whether the order conforms to the metasyntax. When the order conforms to the metasyntax, the transaction processor 130 forwards the order to the executing processor 150.

Generally, the order source 110, the transaction processor 130, and the executing processor 150 are implemented on one or more computer systems. Each computer system may include one or more computing devices and one or more controllers. An example of the computing device is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions.

These computer systems may include a controller to operate the computing device. A controller is a software application loaded on the computing device for commanding and directing communications enabled by the computing device. Other examples include a program, a piece of code, an instruction, a device, a computer, a computer system, or a combination thereof, for independently or collectively instructing the computing device to interact and operate as described herein. The controller may be embodied permanently or temporarily in any type of machine, component, equipment, storage medium, or propagated signal capable of providing instructions to the computing device.

The order source 110 includes a computer system configured to generate and transmit an order to the transaction processor 130. Generally, the order includes parameters and information enabling the transaction to be processed electronically.

The order source 110 typically includes one or more devices and/or controllers. For example, the order source 110 may include one or more general-purpose computers (e.g., personal computers), one or more special-purpose computers (e.g., devices specifically programmed to communicate with each other and/or the transaction processor 130), or a combination of one or more general-purpose computers and one or more special-purpose computers. The order source 110 may be arranged to operate within or in concert with one or more other systems, such as for example, one or more LANs ("Local Area Networks") and/or one or more WANs ("Wide Area Networks").

The network 120 includes one or more communications components configured to enable the order source 110 to exchange orders with the transaction processor 130. The network 120 may include a direct link between the order source 110 and the transaction processor 130, or it may include one or more networks or subnetworks between them (not explicitly shown). Each network or subnetwork may include, for example, a wired or wireless data pathway capable of carrying and receiving data. Examples of network 120 include the Internet, the World Wide Web, WANs ("Wide Area Networks"), LANs ("Local Area Networks"), analog or digital wired and wireless telephone networks (e.g., PSTN ("Public Switched Telephone Network"), ISDN ("Integrated Services Digital Network"), or xDSL ("any form of Digital Subscriber Loop")), radio, television, cable, satellite, and/or other delivery mechanisms for carrying data.

The transaction processor 130 includes one or more computer systems configured to receive orders and process the orders electronically. The transaction processor 130 may include a corporate infrastructure, an e-commerce network, an application service provider, an online service provider, and/or another array of systems.

The library of metasyntax 135 typically includes one or more devices, components or programs configured to serve as a data repository rules used by for the transaction processor 130. Typically, the library of metasyntax 135 may include a server or computing system configured to enable other devices to access and retrieve the metasyntax. Other examples of the library of metasyntax may include a mainframe computing system, and/or a workgroup system. Although the library of metasyntax 135 is illustrated as a computer system, the library of metasyntax may include a program or code segment configured to operate as part of the transaction processor 130. For example, the library of metasyntax 135 may include a function call that manages a database of metasyntax rules.

The network 140 is configured to enable the transaction processor 130 to exchange validated orders with the executing processor 150. Generally, the network 140 may relate to the classes of equipment described previously with respect to network 120. However, the network 140 is not limited to the equipment that is used in network 120. For example, network 120 may use a PSTN network to exchange orders between the order source 110 and the transaction processor 130 while network 140 uses a LAN to exchange validated orders between the transaction processor 130 and the executing processor 150.

The executing processor 150 includes one or more computer systems configured to receive an order that has been validated by the transaction processor 130 and to execute the transaction included in the order. For example, the executing processor 150 may receive a message with the validated order. The executing processor 150 then may process the order by executing the transaction.

Figure 2:
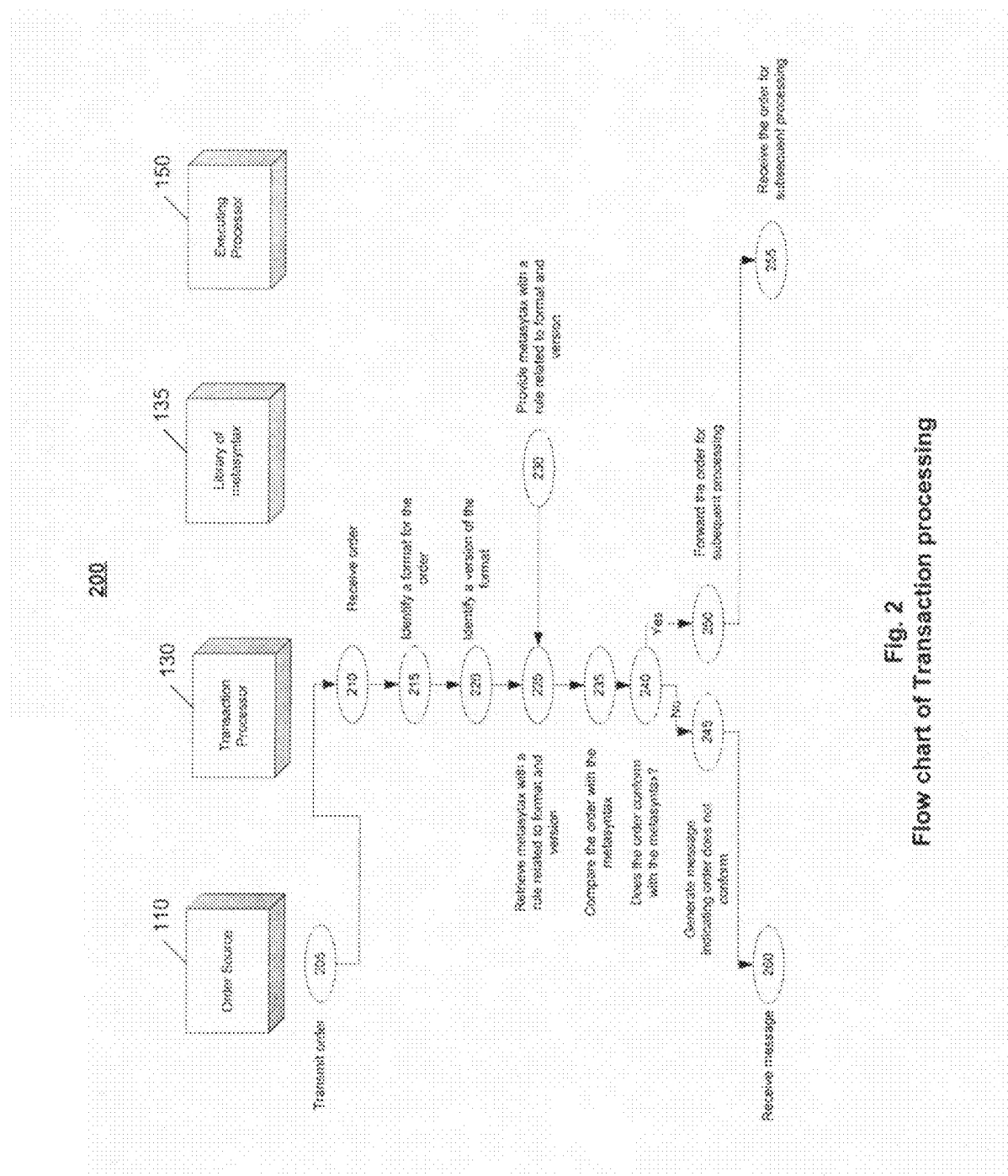
FIG. 2 is a flow chart showing how a transaction may be processed.

Referring to FIG. 2, flow chart 200 illustrates how an order source 110 may transmit an order to the transaction processor 130 for validation so that the executing processor 150 may subsequently receive and execute the transaction. Flow chart 200 illustrates how the systems may interface with each other to process an order.

Initially, the order source 110 transmits an order to the transaction processor 130 (step 205). Generally, transmitting an order includes receiving parameters describing a transaction and packaging the parameters into a message, file, record, or datagram to be processed. An order may be generated by an operator manually entering in the numbers on a form. Although an order may be generated manually, the order also may be generated in an automated manner. For example, the order source 110 may receive a message with transaction parameters, extract the transaction parameters from the message, and incorporate the transaction parameters into an order. The order then is sent to the transaction processor 130.

The transaction processor 130 receives the order (step 210). Receiving the order may include receiving a message that contains transaction parameters. Although receiving the order is described in the context of a network-based transaction system, the transaction processor 130 also may operate in other environments. For example, the order source 110 may be running as a first program on a mainframe computer. The transaction processor 130 may be configured as a second program on the mainframe computer. Transmitting and receiving the order may involve exchanging information between the first and second programs. Exchanging information may include interprocess communications and/or sharing a common memory location or file.

The transaction processor 130 identifies a format for the order (step 215). Identifying a format for the order may include identifying a label, a commonly used convention and/or a standard that describes the format in which the order has been written. Identifying the format also may include identifying a label or parameter used to describe the order. For example, a certain offset in a message may be used to describe the format (e.g., the offset includes a string identifying the format version). Identifying the format also may include analyzing portions of the order to determine the format. For example, the format may be identified by searching for a nomenclature that indicates the format.

The transaction processor 130 identifies a version of the format (step 220). For example, within a standard format, there may be different versions that have been released. Each version may address different transaction requirements. For example, a first version in a format may reflect the work of a standards body while a second version may reflect modifications that the standards body has made.

Identifying a version may include searching for a label in the order. For example, there may be a text string that identifies the format version. Alternatively, the version may be identified by determining the convention that is used. For example, the convention may include a particular arrangement of parameters.

The transaction processor 130 works with the library of metasyntax 135 to retrieve the metasyntax (step 225), which the library of metasyntax provides with a rule related to the format and the version previously identified (step 230). When the transaction processor 130 and the library of metasyntax 135 are separate computing systems, retrieving the metasyntax may include exchanging one or more messages with one or more rules in the metasyntax. When the transaction processor 130 and the library of metasyntax 135 are more closely integrated (e.g., they are different programs on the same computer system, or different code segments in a computer program), providing the metasyntax may include providing the metasyntax through an interprocess communications message.

In any event, the order is compared with the metasyntax (step 235). Generally, comparing the order with the metasyntax includes analyzing an entry in the order and relating the entry to a rule appearing in the metasyntax. For example, the metasyntax may be searched to find a rule that describes the entry. When there is a matching entry, the entry may be parsed according to the convention in that entry. Depending on the underlying format, the rule may allow for variation in the entry. For example, the rule may designate some elements as optional. Thus, an optional element may not be required to appear.

After comparing the order with the metasyntax, the transaction processor 130 determines whether the order conforms to the metasyntax (step 240). Generally, an order conforms to the metasyntax when each element in the order conforms to one of the rules of the metasyntax. For example, a first element in the order may be described by a first rule, a second element may be described by a second rule, and a third element may be described by a third rule. Although comparing the order with the metasyntax has been described as matching an element in the order with a rule in the metasyntax, determining whether the order conforms may include relating larger portions or even the entire order with a rule in the metasyntax descriptive of the larger portions or the entire order.

When the order does not conform to the metasyntax, the transaction processor may generate a message indicating that the order does not conform (step 245). The message may be sent to the order source 110, which receives the message (step 260). The message may include a description of the error and how transaction may be remediated. The order source may examine the order and remediate the error. For example, the order source 110 may supply a missing parameter so that a suspended transaction may be completed later without comparing the remainder of the order to the metasyntax. In another example, the user may be allowed to enter new metasyntax that describes a valid format and version. The new metasyntax may include a modification of an existing rule in the existing metasyntax, or the addition of a new rule to the existing metasyntax. The user also may enter a new form of metasyntax that describes a new format and/or version that will be used.

When the order conforms to the metasyntax, the transaction processor may forward the order for subsequent processing (step 250). In one example, the order may be forwarded with the metasyntax so that subsequent devices or programs may use the metasyntax to process the transaction. The metasyntax may be used to map parameters to a known format recognized by the executing processor 150. In another example, the transaction processor 130 may forward the order without forwarding the metasyntax. The executing processor 150 may rely on the transaction processor 150 to determine that the order is valid. In yet another example, the order may be converted to a different format using the metasyntax to describe how the order may be transformed to generate the different format. Regardless of whether the metasyntax is forwarded and/or the order is converted, the executing processor 150 receives the order (step 255).

Figure 3:
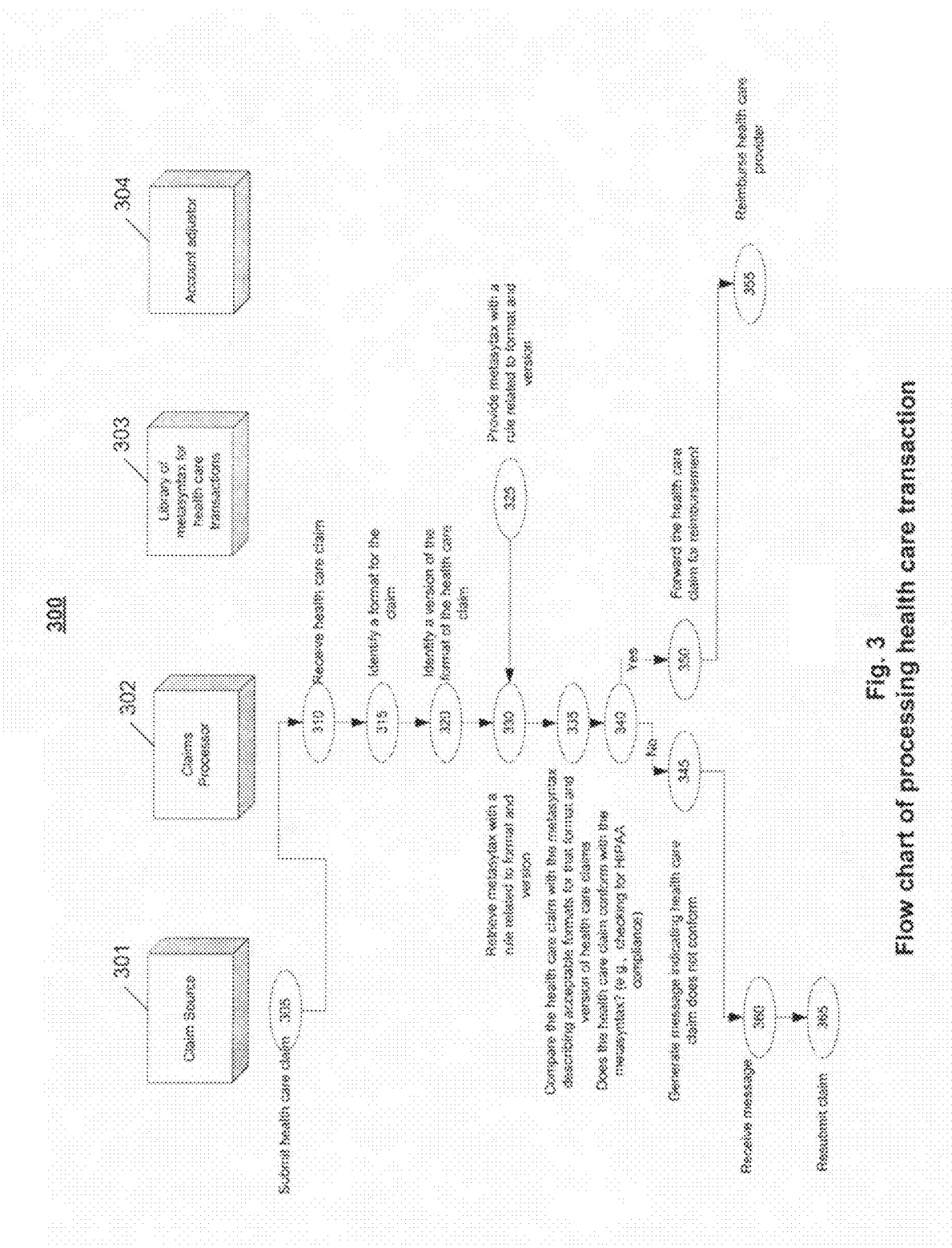
FIG. 3 is a flow chart showing how a health care claim may be processed.

One type of order that may be processed is a health care transaction. FIG. 3 is a flow chart 300 illustrating how a health care transaction may be processed. For example, a health care claim may be submitted to reimburse a health care provider. Generally, the systems described with respect to FIG. 3 have been described previously with respect to FIGS. 1 and 2. For example, the claim source 301, the claims processor 302, the library of metasyntax for health care transactions 303, and the account adjustor 304 generally correspond to the order source 110, the transaction processor 130, the library of metasyntax 135, and the executing processor 150 described with respect to FIGS. 1 and 2. However, the systems described with respect to FIG. 3 illustrate how the systems described previously may be used in the context of a health care environment.

Initially, the claim source 301 submits a health care claim (step 305). Submitting a health care claim may involve aggregating information describing health care that has been provided, packaging the health care information in a claim, and submitting the claim for processing. The claims processor 302 receives the claim (step 310). The claims processor 302 identifies a format for the claim (step 315) and also identifies a version of the format (step 320). For example, the claims processor may determine that the claim relates to a particular HIPAA compliance requirement.

With the format and version of the claim identified, the claims processor 302 interfaces with the library of metasyntax for health care transactions 303. For example, the library of metasyntax 303 may provide the metasyntax with a rule related to the format and version to the claims processor 302 (step 325), which then receives the metasyntax (step 330).

The claims processor 302 then compares the health care claim with the metasyntax describing acceptable formats for that format and version of the health care claim (step 335). For example, the claim may be formatted for a particular HIPAA standard. The metasyntax may describe acceptable formats for the claims. In one example, the claims processor 302 may compare the claim against several different instantiations of the metasyntax. The multiple instantiations may be selectively reduced as the claim is subsequently processed.

The claims processor 302 determines whether the claim complies with the metasyntax (step 340). Determining whether the claim complies includes determining that each element in the claim is validly described by a rule appearing in the metasyntax. When the claim does not comply with the metasyntax, the claims processor generates a message indicating that the health care claim does not conform (step 345). The claim source then may receive the message (step 360), remediate the error, and resubmit the claim (step 365).

When the claim conforms to the metasyntax, the claims processor 302 may forward the claim for reimbursement (step 350). The account adjustor 304 receives the claim and reimburses the health care provider (step 355). For example, an insurance account may be debited and a health care provider account may be credited.

FIG. 4 illustrates exemplary metasyntax 400 that may be used to process a transaction. The metasyntax 400 may describe, for example, elements appearing in the order described in FIG. 2 and the claim described in FIG. 3. Metasyntax 400 includes a nested group syntax 410, a multiple copies syntax 420, an optional presence syntax 430, a multiple copies override syntax 440, a required elements syntax 450, and a conditional clause element 460.

The nested group syntax 410 may be used to describe constituent elements appearing in a larger element. For example, nested group syntax 410 reads:

LOOP__10000=ISA, LOOP__20000#, IEA
LOOP__20000=GS, LOOP__30000#, GE

In nested group syntax 410, LOOP__20000 may be nested in LOOP__10000 between the ISA and IEA elements. LOOP__30000 may include a rule that appears elsewhere and defines other elements that may be used in the rule for LOOP__20000. The # indicates that multiple copies may be used.

The multiple copies syntax 420 may be used to describe elements that may appear more than one time. For example, multiple copies syntax 420 reads:
LOOP__10000=ISA, LOOP__20000#, IEA
LOOP__10000=ISA, LOOP__20000, IEA In the first line of this example, LOOP__20000 may occur multiple times. In the second line, LOOP__20000 may only occur one time. The multiple copies is indicated by the # symbol.

The optional presence syntax 430 may be used to describe elements that may appear but are not required. The optional presence element 430 reads:
LOOP__30000=ST, BHT#, REF*#, LOOP__31000*#, LOOP__32000*#, SE In this example, the REF element can occur zero, one, or multiple times within the LOOP__30000 element. The optional presence is indicated by the *.

The multiple copies override element 440 may be used to create rules with a higher priority than the multiple copies metasyntax. The multiple copies override element 440 reads:
LOOP__10000=ISA, LOOP__20000#, IEA
MULTIPLEOVERRIDE0002=__10000/__20000

The use of the MULTIPLEOVERRIDE0002 keyword followed by the path of the LOOP__20000 element indicates that the multiple copies of LOOP__20000 allowed by the first line are overridden during processing of the received order.

The required element 450 may be used to designate elements that are required to appear. For example, in a health care transaction, a required element may include the name or patient identifier. The required element 450 reads:
LOOP__30000=ST, BHT#, REF*#, LOOP__31000*#, LOOP__32000*#, SE In this example, ST, BHT, and SE are all required elements within the LOOP__30000 element, while REF, LOOP__31000, and LOOP__32000 are not.

The conditional clause element 460 may be used to designate validity only when certain values are present in an element. For example, a health care claim may only be valid when a certain transaction is charged a predetermined amount. The conditional clause element 460 reads:
MULTIPLEOVERRIDE0004=__10000/__20000/__30000/__32000/HL-03(20>22>23)

In this example, the override of a multiple copy is only allowed if the HL-03 element (contained within the LOOP__32000 element) contains a value of 20, 22, or 23.

Other implementations are within the scope of the following claims. For example, the metasyntax need not be limited to determining the validity of transactions or to decomposing an order into a new format. The metasyntax may be used to classify orders to detect fraud. For example, the metasyntax may be used to describe a range of parameters that may be indicators of concern. Upon comparing the order with the metasyntax rule used to describe fraudulent activity, the order be forwarded to a separate processor that examines the order and correlates the order with other suspicious activity. This correlation then may flag suspicious transactions for investigators.

What is claimed is:

1. An automated method of processing an electronic transaction, the method comprising:
receiving, on a computer with a processor, an order to execute a transaction electronically;
identifying, on the computer, a format for the order;
identifying, on the computer, a version of the format;
retrieving, on the computer, a metasyntax with a rule related to the identified format and the identified version, the rule defining one or more acceptable arrangements of one or more elements in the transaction;
relating, on the computer, the order to the metasyntax;
determining, on the computer, whether the order conforms to the metasyntax;
generating, on the computer, a message to a user that the order does not conform to the metasyntax, the message including a description of the error and an indication of how the transaction may be remediated;
transmitting, using the computer, the message to the user that enables the user to enter a revision to the rule to process the order;
receiving, on the computer, the revision to the rule from the user; and
forwarding, on the computer, the order for subsequent processing when the order conforms to the metasyntax.

2. The method of claim 1 wherein the metasyntax defines elements treated as a nested group.

3. The method of claim 1 wherein the metasyntax defines whether an element is required.

4. The method of claim 1 wherein the metasyntax defines multiple copies of an element.

5. The method of claim 1 wherein the metasyntax defines a set of elements.

6. The method of claim 1 wherein the metasyntax overrides a multiple copies attribute.

7. The method of claim 1 wherein the metasyntax instructs a program how to parse and process the order.

8. The method of claim 1 further comprising forwarding the metasyntax for subsequent processing when the order conforms to the metasyntax.

9. The method of claim 1 wherein the metasyntax defines a conditional element.

10. A computer with a communications interface and a processor comprising:
a first communications interface structured and arranged to receive an order to execute a transaction electronically;
a format processing component structured and arranged to identify a format for the order;
a version processing component structured and arranged to identify a version of the format;
a metasyntax datastore structured and arranged to retrieve a metasyntax with a rule related to the identified format and the identified version, the rule defining one or more acceptable arrangements of one or more elements in the transaction;
a relating processing component structured and arranged to relate the order to the metasyntax;
a conformance processing component structured and arranged to:
determine whether the order conforms to the metasyntax; generate a message to a user that the order does not conform to the metasyntax;
transmit the message to the user that enables the user to enter a revision to the rule to process the order, the message including a description of the error and an indication of how the transaction may be remediated;
receive the revision to the rule from the user; and a second communications interface structured and arranged to forward the order and the metasyntax for subsequent processing when the order conforms to the metasyntax.

11. The transaction processor of claim 10 wherein the metasyntax defines elements treated as a nested group.

12. The transaction processor of claim 10 wherein the metasyntax defines whether the element is required.

13. The transaction processor of claim 10 wherein the metasyntax defines multiple copies of the element.

14. The transaction processor of claim 10 wherein the metasyntax defines a set of elements.

15. The transaction processor of claim 10 wherein the metasyntax overrides a multiple copies attribute.

16. The transaction processor of claim 10 wherein the metasyntax instructs a program how to parse and process the order.

17. The transaction processor of claim 10 wherein the second communications interface is structured and arranged to forward the metasyntax for subsequent processing when the order conforms to the metasyntax.

18. The transaction processor of claim 10 wherein the first communications interface, the format processing component, the version processing component, the metasyntax datastore, the relating processing component, the conformance processing component, and the second communications interface are all implemented by a single processor.

19. The transaction processor of claim 10 wherein the metasyntax indicates a conditional element.

20. A transaction processing program on a computer readable medium for controlling a computer, the program comprising:
    a first communications code segment structured and arranged to receive an order to execute a transaction electronically;
    a format code segment that controls the computer to identify a format for the order;
    a version code segment that controls the computer to identify a version of the format;
    a metasyntax code segment that causes the computer to retrieve a metasyntax with a rule related to the format and version, the rule defining one or more acceptable arrangements of one or more elements in the transaction;
    a relating code segment that causes the computer to relate the order to the metasyntax;
    a conformance code segment that:
        causes the computer to determine whether the order conforms to the metasyntax;
        generate a message to a user that the order does not conform to the metasyntax;
        transmit the message to the user that enables the user to enter a revision to the rule to process the order, the message including a description of the error and an indication of how the transaction may be remediated;
        receive the revision to the rule from the user; and
    a second communications code segment that causes the computer to forward the order and the metasyntax for subsequent processing when the order conforms to the metasyntax.

21. A computer with a communications interface and a processor comprising:
    means for receiving an order to execute a transaction electronically;
    means for identifying a format for the order;
    means for identifying a version of the format;
    means for retrieving a metasyntax with a rule related to the format and version, the rule defining one or more acceptable arrangements of one or more elements in the transaction;
    means for relating the order to the metasyntax;
    means for determining whether the order conforms to the metasyntax;
    means for generating a message to a user that the order does not conform to the metasyntax, the message including a description of the error and an indication of how the transaction may be remediated;
    means for transmitting the message to the user that enables the user to enter a revision to the rule to process the order;
    means for receiving the revision to the rule from the user; and
    means for forwarding the order and the metasyntax for subsequent processing when the order conforms to the metasyntax.

* * * * *

UNITED STATES PATENT AND TRADEMARK OFFICE
CERTIFICATE OF CORRECTION

| | |
|---|---|
| PATENT NO. | : 8,321,235 B2 |
| APPLICATION NO. | : 10/305175 |
| DATED | : November 27, 2012 |
| INVENTOR(S) | : Duke G. Monson et al. |

It is certified that error appears in the above-identified patent and that said Letters Patent is hereby corrected as shown below:

In column 9, line 22, in Claim 18, after "the" delete "a".

Signed and Sealed this
Twelfth Day of March, 2013

Teresa Stanek Rea
*Acting Director of the United States Patent and Trademark Office*